(12) United States Patent
Metz et al.

(10) Patent No.: US 7,399,354 B2
(45) Date of Patent: Jul. 15, 2008

(54) METHOD FOR THE PRODUCTION OF PIGMENT GRANULES

(75) Inventors: Hans Joachim Metz, Darmstadt (DE); Andreas Stohr, Freinsheim (DE); Heinfred Ohleier, Kelsterbach (DE)

(73) Assignee: Clariant Produkte (Deutschland) GmbH, Sulzbach (DE)

( * ) Notice: Subject to any disclaimer, the term of this patent is extended or adjusted under 35 U.S.C. 154(b) by 0 days.

(21) Appl. No.: 10/476,894

(22) PCT Filed: Apr. 27, 2002

(86) PCT No.: PCT/EP02/04697

§ 371 (c)(1), (2), (4) Date: Nov. 5, 2003

(87) PCT Pub. No.: WO02/090446

PCT Pub. Date: Nov. 14, 2002

(65) Prior Publication Data

US 2004/0143040 A1    Jul. 22, 2004

(30) Foreign Application Priority Data

May 10, 2001   (DE) .............................. 101 22 616

(51) Int. Cl.
| | | |
|---|---|---|
| *C09B 67/50* | (2006.01) | |
| *C09B 67/00* | (2006.01) | |
| *C09B 27/00* | (2006.01) | |
| *C09B 48/00* | (2006.01) | |
| *C08K 5/00* | (2006.01) | |
| *C09D 4/00* | (2006.01) | |
| *C09D 101/00* | (2006.01) | |
| *C09D 201/00* | (2006.01) | |

(52) U.S. Cl. ..................... 106/493; 106/412; 106/413; 106/491; 106/496; 106/497; 106/498; 106/499; 106/502

(58) Field of Classification Search ......... 106/412–413, 106/491, 493, 496–499, 502

See application file for complete search history.

(56) References Cited

U.S. PATENT DOCUMENTS

| 2,157,378 | A | * | 5/1939 | Abrams ..................... 106/220 |
| 2,890,969 | A | * | 6/1959 | Schossberger et al. ...... 428/328 |
| 3,773,535 | A | * | 11/1973 | Burgyan et al. ............. 106/434 |
| 3,778,288 | A | * | 12/1973 | Ridge et al. ................. 106/502 |
| 4,129,638 | A | * | 12/1978 | Ritze ......................... 264/117 |
| 4,230,501 | A | * | 10/1980 | Howard et al. .............. 106/502 |
| 4,285,994 | A | * | 8/1981 | Pearce et al. ................ 427/222 |
| 4,302,254 | A | | 11/1981 | Landler |
| 4,919,922 | A | | 4/1990 | Miyoshi et al. |
| 5,173,116 | A | * | 12/1992 | Roth .......................... 106/401 |
| 5,283,149 | A | * | 2/1994 | Tyagi et al. ............. 430/137.11 |
| 5,298,355 | A | * | 3/1994 | Tyagi et al. .............. 430/108.4 |
| 5,328,506 | A | * | 7/1994 | Crumbley et al. ............ 106/416 |
| 6,451,102 | B1 | * | 9/2002 | Hilder et al. ................ 106/417 |
| 6,485,558 | B1 | * | 11/2002 | Metz et al. .................. 106/493 |
| 7,029,818 | B2 | * | 4/2006 | Rohr et al. ............. 430/137.15 |
| 2002/0098435 | A1 | | 7/2002 | Rohr et al. |

FOREIGN PATENT DOCUMENTS

| DE | 19941061 | | 3/2001 |
| EP | 0424896 | | 5/1991 |
| EP | 1081195 | | 3/2001 |
| FR | 1475647 | | 4/1967 |
| GB | 915453 | * | 1/1963 |
| GB | 1 538 718 | * | 4/1979 |
| NL | 8402535 | | 3/1986 |

OTHER PUBLICATIONS

English abstract for JP 5320532, May 15, 1992.
Co-pending U.S. Appl. No. 11/717,989 by Metz et al., filed Mar. 14, 2007.

* cited by examiner

*Primary Examiner*—Jerry A. Lorengo
*Assistant Examiner*—Patricia L Hailey
(74) *Attorney, Agent, or Firm*—Richard P. Silverman; Tod A. Waldrop

(57) ABSTRACT

Dispersible pigment granules are produced by mixing an aqueous suspension of an organic pigment with an aqueous emulsion of a wax-like additive. The aqueous emulsion is then allowed to coagulate and the resulting aqueous dispersion is spray dried.

14 Claims, No Drawings

METHOD FOR THE PRODUCTION OF PIGMENT GRANULES

This invention relates to a process for producing an organic colorant composition in granule form, consisting of wax-coated organic pigments.

Organic pigments are customarily synthesized in the form of powders. The powders consist of very small particles, whose dimensions can be in the range from submicroscopic to about 100 µm. For commercial practice it is advantageous for organic pigments to have approximate particle sizes from 0.01 to 0.1 µm for transparent forms and from 0.1 to 10 µm for opaque forms. However, pulverulent pigments have a very small particle size and so tend to dust. Dusting is a critical factor in the manufacture and further processing of pigment powders. Dusting leads to the contamination of instruments, plant and products, so that very expensive and time-consuming cleaning is often necessary for product changeovers. In addition, workplace hygiene and environmental protection legislation and regulations are becoming more and more stringent. This has led to demands on the part of pigment processors that nondusting pigmentary forms be provided.

Numerous methods have already been tried for converting the pigments into a low-dust form. However, it has been determined that improved dusting is usually only achieved at the expense of other physical properties of pigment particles, especially at the expense of dispersibility. This problem was solved in DE 199 41 061 A1 by adding waxy auxiliary substances to the granulation during a pigment finishing operation in an organic solvent. However, the process mentioned has the disadvantage that it utilizes elevated temperatures, overpressure and organic solvents and therefore is convenient only for those pigments for which a solvent finish is absolutely necessary to achieve the desired physical properties. As well as these "solvent finish pigments" there are organic pigments which are finished in water only, i.e., without organic solvent, or where a finish may be dispensed with entirely.

It is an object of the present invention to provide a process that requires no organic solvents, no overpressure and utilizes low temperatures and provides organic pigments in granule form, that is dustlessly handleable and readily dispersible in the application medium.

We have found that this object is achieved, surprisingly, when the pigment is contacted with a wax or waxy polymer prior to a spray granulation by an aqueous wax or polymer emulsion and an aqueous pigment suspension being mixed with each other, then the wax or polymer emulsion being made to coagulate and, in the course thereof, the wax or polymer being deposited on the pigment or at least contacted with the pigment.

The present invention accordingly provides a process for producing a readily dispersible granular pigment, characterized in that it comprises an aqueous suspension of an organic pigment being mixed with an aqueous emulsion of a waxy additive, then the aqueous emulsion being made to coagulate and the aqueous dispersion thus obtained being spray dried.

By making the aqueous emulsion coagulate, the waxy additive is made to come into contact with the pigment and is fully or partially deposited on the pigment particles. The spray drying provides first a granulation into a suitable particle size without impairing the contact which has been achieved between the pigment and the waxy additive. Secondly, the grinding which is otherwise necessary in the production of pigment powders is avoided.

The pigment granules thus produced preferably have a particle size distribution in the range from 0.05 to 5 mm. Particular preference is given to granules having particle diameters in the range from 0.1 to 2 mm. The granules are spherical and hence free-flowing and so readily meterable. Moreover, their size and weight are such that the granules are low-dusting as well.

Useful organic pigments include for example azo pigments, such as monoazo pigments, disazo pigments, Naphtol pigments and metal complex pigments, and also polycyclic pigments, such as isoindolinone pigments and isoindoline pigments, anthanthrone pigments, thioindigo pigments, quinophthalone pigments, anthraquinone pigments, dioxazine pigments, phthalocyanine pigments, quinacridone pigments, perylene pigments, perinone pigments, diketopyrrolopyrrole pigments and azomethine pigments.

The process of the present invention is particularly advantageous for laked azo pigments, for example laked β-naphthol pigments, laked BONS pigments (BONS=betaoxynaphthoic acid), laked Naphthol AS pigments and laked naphthalenesulfonic acid pigments.

Examples of laked β-naphthol pigments are C.I. Pigment Red 49, P.R. 50, P.R. 51, P.R. 53, P.R. 68, P.O. 17, P.O. 46.

Examples of laked BONS pigments are P.R. 48, P.R. 52, P.R. 57, P.R. 58, P.R. 63, P.R. 64, P.R. 200, P. Brown 5.

Examples of laked Naphthol AS pigments are P.R. 151, 237, 239, 240, 243, 247.

Examples of laked naphthalenesulfonic acid pigments are R. Yellow 104, P.O. 19, P.R. 60, 66, 67.

Waxy additives typically comprehends waxes as such and also thermoplastic polymers of waxy character.

Waxes form a group of natural or synthetic materials having identical or similar performance characteristics, characterized by the following physical properties: Kneadable at 20° C., solid to brittley hard, coarsely to finely crystalline, translucent to opaque, but not glassy; melting point above 40° C. without decomposition, having a comparatively low viscosity and non-stringing even when just melted, strongly temperature-dependent consistency and solubility, polishable under slight pressure (Römpps Chemie-Lexikon, volume 6, 8th edition 1988, p. 463, Franck'sche Verlagshandlung).

Preferred waxes are: natural waxes, such as vegetable waxes, for example carnauba wax, candelilla wax, animal waxes, for example beeswax, modified natural waxes, such as for example paraffin waxes, microwaxes, partly synthetic waxes, such as for example montan ester waxes, or wholly synthetic waxes, such as polyolefin waxes, for example polyethylene and polypropylene waxes which are preparable by classic processes, such as high pressure polymerization and Ziegler-Natta polymerization or else via more recent processes, such as metallocene polymerization; polyethylene glycol waxes; cycloolefin polymer waxes, amide waxes, such as for example N,N'-distearoylethylenediamine, and also chlorine- or fluorine-containing polyolefin waxes or polyethylene-polytetrafluoroethylene wax blends.

Particular preference is given to polyolefin waxes, including polyolefin waxes which contain polar groups, formed by subsequent oxidation of the polyolefin wax, by grafting reaction with carboxylic acid, carboxylic ester, carboxylic anhydride or hydroxyl monomers or by copolymerization of an olefin with a carboxylic acid, carboxylic ester, carboxylic anhydride or hydroxyl monomer.

Useful thermoplastic polymers are relatively high molecular weight compounds which have a waxy character and are preferably produced by addition polymerization, polycondensation or polyaddition processes, for example thermoplastic polyester resins, epoxy resins, styrene-acrylate copolymer resins, styrene-butadiene copolymer resins, cycloolefin copolymer resins, such as ®Topas for example.

The number average molecular weight ($\overline{M}_n$) of the waxy additives shall have values less than 20 000 g/mol, preferably less than 5000 g/mol, particularly preferably with a number average molecular weight ($\overline{M}_n$) less than 3000 g/mol.

Next the drop point of the waxy additives is preferably in the range from 60 to 180° C. and more preferably in the range from 80 to 140° C.

The amount and type of the waxy additive can vary according to the field of use of the granular pigment, in particular in order that compatibility with the application medium may be ensured. To achieve a defined performance profile, it is also possible to use an emulsion consisting of a mixture of at least two different waxy additives or to use at least two emulsions composed of different waxy additives.

The term "aqueous emulsion of a waxy additive" is to be understood as meaning dispersions of finely divided natural and/or synthetic waxes or waxy polymers (particle size 0.05 to 5 μm) in aqueous dispersion media. Included in the definition are consequently dispersions of polymers, such as natural rubber (kautschuk latex) and synthetic rubber (synthetic latex), of synthetic resins (synthetic resin dispersions) and plastics (plastics dispersions), such as addition polymers, polycondensates and polyaddition compounds.

Such dispersions are known and often commercially available as well.

Emulsifiers are customarily present as well as the waxy additive. Anionic, cationic or nonionic emulsifiers can be used as emulsifiers for the purposes of the present invention.

Useful anionic emulsifiers include for example salts of saturated or unsaturated fatty acids, for example stearic acid, oleic acid or linoleic acid. The latter are neutralized with suitable bases such as for example alkali metal hydroxides, ammonia or amines to form salts. Useful amines include for example unsubstituted or substituted, for example hydroxyl-containing, aliphatic amines. As examples there may be mentioned tri-i-propylamine, diethanolamine, triethanolamine and also dimethyl- or diethylaminoethanol.

Examples of cationic emulsifiers are salts of optionally alkoxylated fatty amines. As examples of nonionic emulsifiers there may be mentioned alkoxylated fatty acids, fatty alcohols or fatty amines and also glyceryl or sorbitol esters. It is also possible to use mixtures of the aforementioned emulsifiers. The waxy emulsion of the waxy additive contains the waxy additive in a concentration which is conveniently in the range from 5 to 40% by weight, and preferably in the range from 10 to 30% by weight and the emulsifier in a concentration of from 0 to 40% by weight, and preferably 1 to 20% by weight.

The deposition of the waxy additive on the pigment or at least the contacting of the waxy additive with the pigment is accomplished as described in what follows: An aqueous pigment suspension is stirred together with an aqueous emulsion of the waxy additive, conveniently at temperatures between 20 and 95° C., and preferably between 40 and 85° C. The aqueous pigment suspension contains conveniently 3 to 20% by weight and preferably 5 to 15% by weight of pigment, based on the total weight of the pigment suspension.

The pigment suspension can come directly from the pigment synthesis or from a finishing operation or can be produced by suspending a pigment powder in water. It is preferable for 50 to 98 parts by weight and preferably 60 to 90 parts by weight of aqueous pigment suspension to be mixed with 50 to 2 parts by weight and preferably 10 to 40 parts by weight of aqueous emulsion of the waxy additive. After thorough mixing, the aqueous emulsion is made to coagulate and the waxy additive deposits fully or partially on the pigment. The coagulation can be brought about by changing the pH, adding salts, especially inorganic salts, and/or by addition of known coagulation assistants. For instance, an alkaline emulsion stabilized by an anionic system, for example by a fatty acid salt, can be broken by acidification, preferably at pH 6.5 to 1. An acidic emulsion stabilized by a cationic system, for example by a fatty amine, can be broken by addition of alkali, preferably at pH 7.8 to 12.

Thereafter, there is an aqueous pigment dispersion in which the waxy additive has been partially or fully deposited on the pigment or is at least in contact with the pigment.

The aqueous dispersion is if necessary adjusted with water to the desired concentration, conveniently to a 5-40% by weight suspension of the pigment coated or in contact with the waxy additive, if necessary homogenized by means of a homogenizing assembly, for example a colloid mill, and subsequently spray-dried to form granules.

From a performance standpoint it can be advantageous in some cases for the wax-coated pigment to be filtered off once more and washed prior to granulation by spray drying.

The spray drying can be accomplished using spray towers equipped with a one-material nozzle or spray towers which effect a size-enlarging granulation (e.g., Fluidized bed Spray Dryers). Spray towers equipped with a one-material nozzle eject the suspension in the form of relatively large drops from which the water evaporates. When the temperatures in the spray tower are around or above the drop point of the waxy additive, the additive will melt, producing a spherical granule having a smooth surface.

FSD spray towers dispense the suspension to form a fine powder. The vigorous fluidization in the fluid bed and the recirculation of the fine pulverulent particles entrained by the exit air and deposited in an upstream cyclone ensure that the spray drying takes place in a turbulent cloud of powder. This gives rise to a layering effect and, at temperatures in the tower around or above the drop point of the waxy additive, the particles coalesce to form a raspberrylike granule. The residual moisture content and the granulometry are policed in the fluid bed.

The gas inlet temperature in the spray tower is normally in the range from 180 to 250° C. and preferably in the range from 190 to 230° C., the gas outlet temperature is normally in the range from 70 to 150° C. and preferably in the range from 90 to 130° C.

The spray-dried granule contains the organic pigment in an amount which is preferably in the range from 50 to 99% by weight and especially in the range from 60 to 95% by weight and the waxy additive in an amount from 1 to 50% by weight and especially from 5 to 40% by weight, based on the total weight of the pigment granule.

The granules can be used for coloring macromolecular organic materials. These can be of natural or synthetic origin. They can be for example natural resins, drying oils or rubber. But they can also be modified natural substances, such as for example chlororubber, cellulose derivatives, such as cellulose esters or cellulose ethers, and particularly wholly synthetic organic polymers (plastics) which are produced by addition polymerization, polycondensation or polyaddition. Among the plastics produced by addition polymerization there may be mentioned in particular the following: polyolefins, such as for example polyethylene, polypropylene, polyisobutylene, and substituted polyolefins, such as for example polystyrene, polyvinyl chloride, polyvinylidene chloride, polyvinyl acetals, polyacrylonitrile, polyacrylic acid, polymethacrylic acid, polyacrylic and polymethacrylic esters or polybutadiene, and also copolymers thereof.

Among the class of plastics produced by polyaddition and polycondensation there may be mentioned: polyesters, polyamides, polyimides, polycarbonates, polyurethanes, polyethers, polyacetals, and also the condensation products of formaldehyde with phenols (phenoplast) and the condensation products of formaldehyde with urea, thiourea and melamine (aminoplasts).

The macromolecular organic material mentioned can be present singly or in mixtures in the form of plastics compounds or melts. It can also be present in the form of its monomers which are polymerized after coloring.

The pigment granules of the present invention can be used in any quantitative ratio which is necessary for coloring the macromolecular organic material. The pigmented macromolecular organic material contains the granules of the present invention in an amount which is customarily in the range from 0.1 to 30% by weight and preferably in the range from 1 to 20% by weight, based on the macromolecular organic material to be pigmented.

The macromolecular organic material can be colored using the granules of the present invention by themselves. To achieve various hues or color effects it is also possible to add other colorants, such as for example white, colored or black pigments, and also effect pigments, to the macromolecular organic material in addition to the granules of the present invention.

The granules are highly concentrated colorants in which the pigments are present in a predispersed form, similarly to a masterbatch. Coloring the macromolecular organic material therefore does not require a great deal of further dispersion, it simply being sufficient to for example mix the granules of the present invention with the macromolecular organic material in roll mills, mixers, other grinding assemblies or in a single-screw extruder.

The ease of incorporation into plastics means that the granules produced according to the present invention can also be used for producing colored toners for laser printers and copiers and for producing powder coatings, the matrix materials of which likewise constitute macromolecular organic materials. The present granules are further useful for producing inks, including printing inks, and color filters.

EXAMPLE 1

25.5 kg of water-moist presscake of unfinished crude P.Y. 191 pigment (corresponding to 7.5 kg of dry pigment) are dispersed in 124.5 kg of water with the aid of a drum stirrer. After heating to 80° C., 18.75 kg of an aqueous emulsion consisting of 16.87 kg of water, 1.67 kg of oxidized polyolefin wax ®Licowax PED 121, emulsified with 0.21 kg of potassium oleate, are added dropwise. After a stirring time of 15 minutes, the pH value is adjusted to pH 5 by addition of hydrochloric acid. After a stirring time of 15 minutes, the suspension is filtered off hot and washed salt-free with water.

The presscake is subsequently adjusted with water to a solids concentration of 10% by weight, dispersed and homogenized by passing through a colloid mill. Thereafter, the homogeneous suspension is sprayed and granulated in an FSD spray tower at a gas inlet temperature of 190° C., a gas outlet temperature of 100° C. and a bed temperature of 75° C.

The pigment granules obtained have a raspberrylike structure.

The granules obtained are virtually dustless and free-flowing.

The color performance was tested in polyethylene and found to be equal to that of the pulverulent type.

EXAMPLE 2

A repeat of example 1 except that the aqueous emulsion consists of 5.06 kg of water, a mixture of 0.86 kg of Licowax PE520 and 0.86 kg of Licowax PED121, emulsified with 0.56 kg of alkylammonium oleate.

The granules obtained are virtually dustless and free-flowing.

The color performance was tested in polyethylene and found to be equal to that of the pulverulent type.

EXAMPLE 3

Pigment Red 247

25.5 kg of water-moist presscake of Pigment Red 247 (corresponds to 7.5 kg of dry pigment) are dispersed in 79.5 kg of water with the aid of a drum stirrer. After heating to 80° C., the pH value is adjusted to pH 3.6 by addition of hydrochloric acid. Thereafter, 18.75 kg of an aqueous emulsion consisting of 16.87 kg of water, 1.67 kg of oxidized polyolefin wax ®Licowax PED 121, emulsified with 0.21 kg of potassium oleate, are added dropwise. The pH after the addition of the wax emulsion is 4.2. After a stirring time of 15 minutes, the suspension is filtered off hot and washed salt-free with water.

The presscake is subsequently adjusted with water to a solids concentration of 10% by weight, dispersed and homogenized by passing through a colloid mill. Thereafter, the homogeneous suspension is sprayed in a spray tower fitted with a single-material nozzle, at a gas inlet temperature of 190° C., a gas outlet temperature of 100° C. and a bed temperature of 75° C.

The pigment granules obtained have a spherical structure.

The granules obtained are virtually dustless and free-flowing.

The color performance was tested in polyethylene and found to be equal to that of the pulverulent type.

EXAMPLE 4

Pigment Red 170

52.26 kg of water-moist presscake of finished Pigment Red 170 (corresponds to 9.1 kg of dry pigment) are dispersed in 77.74 kg of water with the aid of a drum stirrer. At 80° C., the pH value is adjusted to 3.8 by addition of acetic acid and 7.34 kg of an aqueous emulsion consisting of 5.06 kg of water, a mixture of 0.86 kg of Licowax PE520 and 0.86 kg of Licowax PED121, emulsified with 0.56 kg of alkylammonium oleate, are added dropwise. The pH after the addition of the wax emulsion is 5. After a stirring time of 15 minutes, the suspension is filtered off hot and washed salt-free with water.

The presscake is subsequently adjusted with water to a solids concentration of 10% by weight, dispersed and homogenized by passing through a colloid mill. Thereafter, the homogeneous suspension is sprayed in a spray tower fitted with a single-material nozzle, at a gas inlet temperature of 190° C., a gas outlet temperature of 100° C. and a bed temperature of 75° C. The pigment granules obtained have a spherical structure.

The granules obtained are virtually dustless and free-flowing.

The color performance was tested in polyethylene and found to be equal to that of the pulverulent type.

What is claimed is:

1. A process for producing a readily dispersible granular wax-coated pigment particle having a particle size distribution in the range from 0.05 to 5.0 mm, said process comprising
   a) mixing an aqueous suspension of an organic pigment with an aqueous emulsion of a waxy additive to form an aqueous emulsion mixture,
   b) coagulating the aqueous emulsion mixture to form an aqueous dispersion wherein the waxy additive is partially or fully disposed on the organic pigment,
   c) diluting the aqueous dispersion with water and homogenizing to form a homogenized suspension, and
   d) spray drying the homogenized suspension to form a dustless and free-flowing, readily dispersible wax-coated pigment granule comprising from 50 to 99 percent by weight of the organic pigment and from 1 to 50 percent weight of the waxy additive based on said pigment particle, wherein the process uses no organic solvents.

2. A process as claimed in claim 1, wherein the organic pigment is an azo pigment selected from the group consisting of monoazo pigments, disazo pigments, Naphtol pigments, metal complex pigments, and polycyclic pigments selected from the group consisting of isoindolinone pigments, isoindoline pigments, anthanthrone pigments, thioindigo pigments, quinophthalone pigments, anthraquinone pigments, dioxazine pigments, phthalocyanine pigments, quinacridone pigments, perylene pigments, perinone pigments, diketopyrrolopyrrole pigments and azomethine pigments.

3. A process as claimed in claim 1 wherein the organic pigment is a laked azo pigment.

4. A process as claimed in claim 1, wherein the waxy additive is a wax or a thermoplastic polymer of waxy character.

5. A process as claimed in claim 1, wherein the waxy additive is a natural wax, a partly synthetic wax or a wholly synthetic wax.

6. A process as claimed in claim 1, wherein the waxy additive is a polyolefin wax.

7. A process as claimed in claim 1, wherein the aqueous suspension of the organic pigment contains the organic pigment in an amount from 3 to 20% by weight.

8. A process as claimed in claim 1, wherein the aqueous emulsion of the waxy additive contains the waxy additive in an amount of 5 to 40% by weight and an emulsifier in an amount from 0 to 40% by weight, each percentage being based on the weight of the aqueous emulsion.

9. A process as claimed in claim 1, wherein 50 to 98 parts by weight of the aqueous suspension of the organic pigment are mixed with 50 to 2 parts by weight of aqueous emulsion of the waxy additive.

10. A process as claimed in claim 1, wherein the aqueous suspension of the organic pigment is mixed with the aqueous emulsion of the waxy additive at a temperature of between 20 and 95° C.

11. A process as claimed in claim 1, wherein the coagulating step is accomplished by one or more of the steps selected from the group consisting of changing the pH, adding salts and adding a coagulation assistant.

12. A granular wax-coated pigment particle having a particle size distribution in the range from 0.05 to 5.0 mm made in accordance with the process of claim 1.

13. An article colored with the granular pigment particle of claim 12.

14. The process of claim 1, wherein the homogeneous suspension comprises water and from 5 to 40 wt-% of the organic pigment and the waxy additive.

* * * * *